Dec. 2, 1958  H. P. KUPIEC  2,862,775
PACKING GLAND AND SEALING RING
Filed July 23, 1956  2 Sheets-Sheet 1
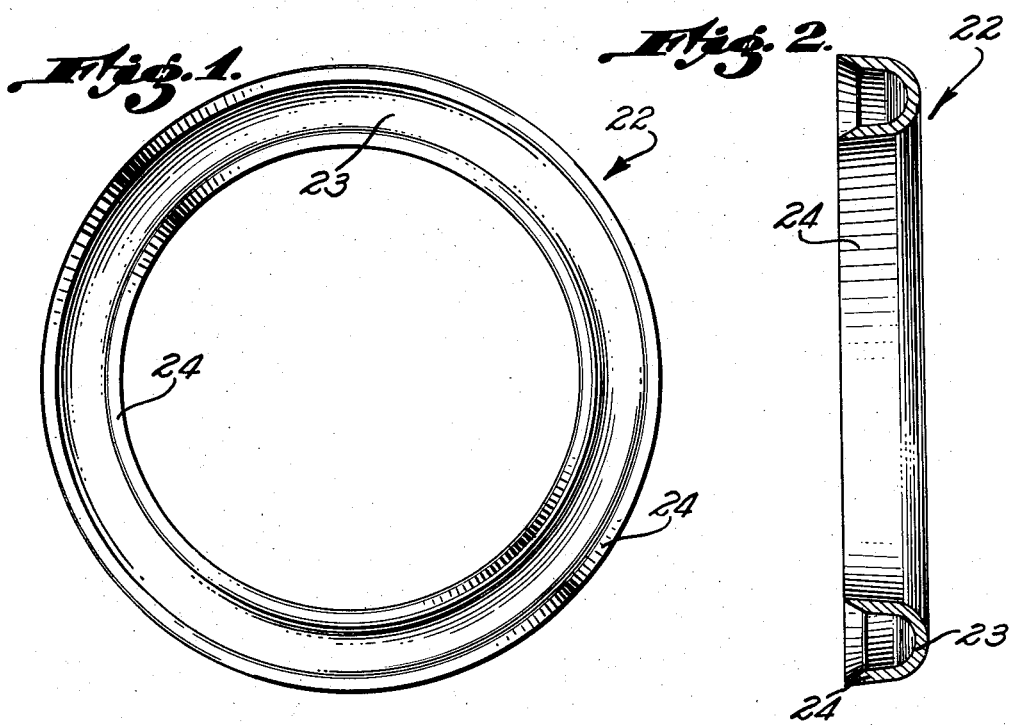
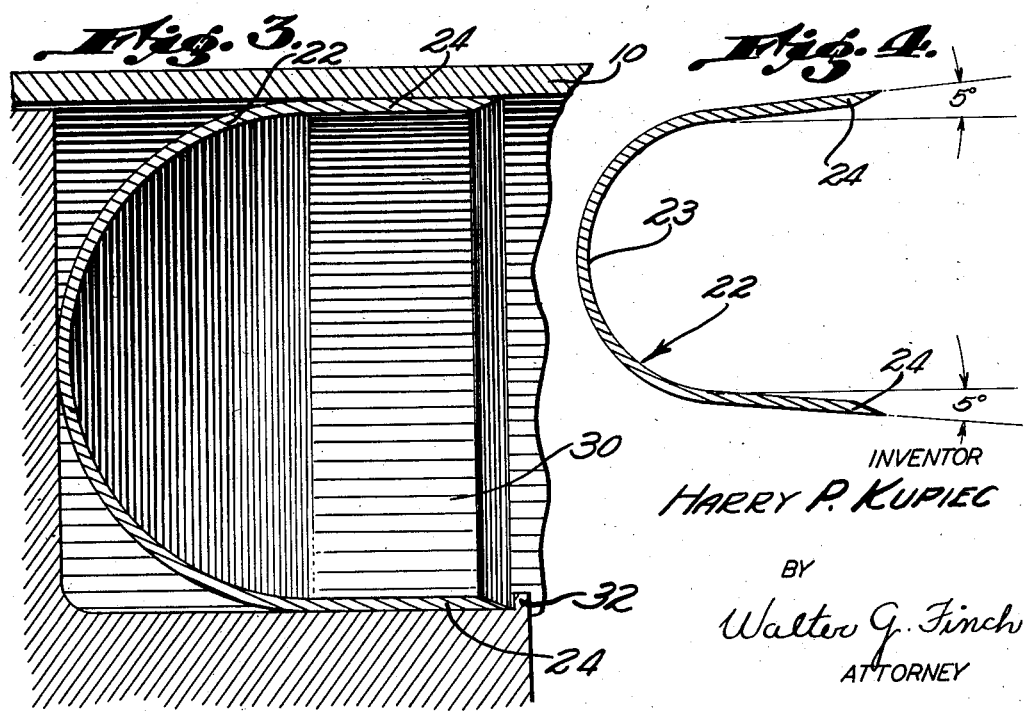
INVENTOR
HARRY P. KUPIEC
BY
Walter G. Finch
ATTORNEY

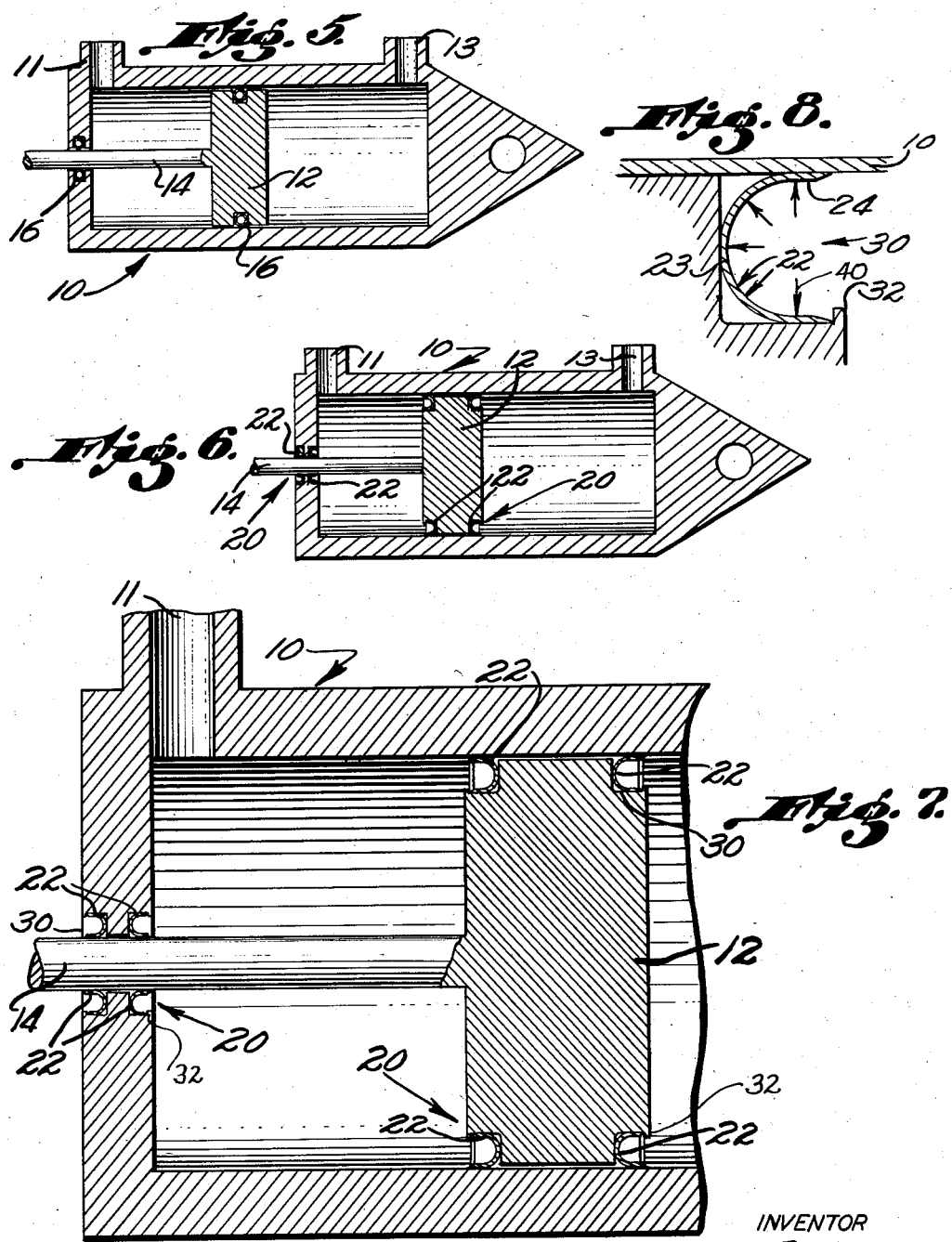

United States Patent Office 2,862,775
Patented Dec. 2, 1958

2,862,775

PACKING GLAND AND SEALING RING

Harry P. Kupiec, Baltimore, Md.

Application July 23, 1956, Serial No. 599,483

2 Claims. (Cl. 309—23)

This invention relates generally to hydraulic and pneumatic packing gland devices, and more particularly it pertains to a new type of packing gland and sealing ring which can be utilized for both static and dynamic applications, with both hydraulically and pneumatically operated equipment.

The hydraulic and pneumatic requirements in the aircraft industry, at the present time, are extending into elevated temperature ranges approximating many hundreds of degrees. For instance, conventional O-rings now being utilized quite satisfactorily accommodate the requirements in a temperature range between −65° F. and 275° F. When the requirements, however, are extended from temperature ranges of −65° F. to 500° F., or to 600° F. to 800° F., in special instances, the conventional O-rings rapidly deteriorate and must be constantly replaced, with the result that they are inefficient and uneconomical to use.

In addition, at high temperatures and pressures, other metallic sealing devices have been utilized for sealing which require the parts, such as pistons, to be made in a multiplicity of pieces, thus requiring a separation of the parts in order to provide for installation of the seal.

It is one of the objects of this invention, therefore, to provide a new type of packing gland and sealing ring which can be utilized efficiently over a wide temperature range at high pressures.

Still another object of this invention is to provide a new type of packing gland and sealing ring which is economical to manufacture, easy to install, and which is efficient and reliable in operational use.

And another object of this invention is to provide a new type of packing gland and sealing ring which can be efficiently used for both static and dynamic applications, at high temperatures and pressures.

To provide a new type of packing gland and sealing ring which can be utilized at elevated temperatures which are higher than those which conventional O-rings can be used, is also another object of this invention.

These and other objects and advantages of this invention will become more apparent by reference to the accompanying specification and drawings in which:

Fig. 1 is a plan view of the sealing ring comprising this invention;

Fig. 2 is a cross-section of the sealing ring shown in Fig. 1 taken through the center of the ring;

Fig. 3 is an enlarged sectional view of the sealing ring in operative position in a packing gland for a piston;

Fig. 4 is a cross-section of the sealing ring in its original position, that is, before installation in a packing gland;

Fig. 5 is a cross-section of a cylinder-piston arrangement illustrating the use of conventional O-rings;

Fig. 6 is a cross-section of the arrangement shown in Fig. 5, illustrating the use of the sealing ring and packing gland comprising this invention;

Fig. 7 is an enlargement of a detail of Fig. 6; and

Fig. 8 is an enlargement of a cross-section of the sealing ring in operative position, illustrating the application of pressure thereto.

In accordance with the invention, there is provided an unique packing gland and sealing ring which can be utilized to efficiently seal hydraulically and pneumatically operated equipment subject to either static or dynamic loading conditions. In its essence, the sealing ring consists of a ring structure whose cross-section has the shape of the letter C. The sealing ring can be manufactured of non-elastomeric materials, such as brass, beryllium copper, steel, tin, and the like.

The sealing ring is provided with a pair of spaced lips which have a flare of approximately five degrees in order to provide a snug fit when installed in a working position. These lips of the sealing ring accomplish sealing in one direction, such as required for static applications. When the ring is needed to seal a structure for dynamic application, such as for sealing pistons or piston rods, it is necessary to use the rings in pairs.

Referring now to Fig. 5 of the drawings, there is illustrated a typical hydraulic or pneumatic actuating cylinder 10 as currently designed for use in the aircraft industry, having entrances 11 and 13, a piston 12 and a piston rod 14. In cylinder-piston arrangements of this type, it is conventional to employ conventional O-rings 16 as seals for both the piston 12 and the piston rod 14. The same arrangement is commonly used where the operating medium is a gas, such as air.

When the O-rings 16 are used at high pressures, such as 3,000 p. s. i., these rings are generally backed up with leather or Teflon back-up rings to prevent extrusion of synthetic rubber O-rings 16. Thus, it is readily apparent that the conventional O-rings, in order to operate satisfactorily, must be utilized in conjunction with other types of rings.

Referring now to Figs. 3, 6, and 7, there are shown packing glands 20, including C-shaped sealing rings 22 comprising this invention, in operative position on the piston 12 and piston rod 14 of the hydraulic or pneumatic actuating cylinder 10, previously mentioned.

The sealing rings 22, which are used in pairs for dynamic applications, such as the use with the piston 12 in the hydraulically or pneumatically operated cylinder 10, are illustrated at each end of the piston 12, or on both sides of the end of the cylinder 10 for the piston rod 14. For purposes of clarity, the sealing rings 22 are shown in loose relationship in Figs. 6 and 7 in order to illustrate the outlines of the sealing rings, while in Fig. 3, the ring 22 is illustrated in an actual operating condition.

As best seen in Figs. 1, 2, 3, and 4, each ring 22 is provided with a pair of lips 24. As shown in Fig. 4, the lips 24 of each ring 22, before installation, are provided with a flare of approximately five degrees in order to provide a snug fit when installed in a working position, as shown in Figs. 3, 6, and 7.

It is to be noted that the upper lip 24 of the sealing ring 22 is scarfed to a fine edge to allow razor edge contact with the surface of the cylinder 10, as seen best in Figs. 3 and 4. In order to make the sealing rings interchangeable for both male and female applications as shown by the applications to the piston head 12 and the piston rod 14, respectively, in Figs. 6 and 7, the outer edge of both the upper and lower lips 24 may be scarfed because by so doing the same sealing ring can be used for either application.

The lips 24 of the ring 22 accomplish sealing in one direction only. It is for this reason, therefore, that it is necessary to utilize the rings 22 in pairs for dynamic application, such as illustrated for the piston head 12 or the piston rod 14 in Figs. 6 and 7. For static application, however, it is necessary to use only one ring.

The sealing rings 22 can be formed from non-elastomeric materials. For example, rings 22 of the type described, can be formed of brass, beryllium copper, steel, tin, or other metals of this type. However, selection of materials to manufacture the sealing ring 22 will depend upon the materials used in the original design of the hydraulic or pneumatic actuating cylinder 10 or the like. It is apparent that no materials should be utilized which will create electrolytic corrosion.

Referring again to Figs. 3, 6, and 7, in order to use a sealing ring 22 as shown, it is necessary to provide a special retaining groove, such as indicated by reference numeral 30. Groove 30 provides for easy installation of the sealing ring 22, which is a material advantage over conventional types of metallic sealing devices. In conventional metallic sealing devices used for sealing pressure up to the time of the present invention, it was necessary to separate the elements in order to provide for the installation of the sealing device. However, by means of the construction of groove 30, it is not necessary to make the pistons 12 in a multiplicity of pieces.

As best seen in Figs. 3 and 7, the sealing ring 22 is retained in the retaining groove 30 by a small projection or lip 32 provided at the edge of each groove. This projection or lip 32 is kept purposely very short to permit slipping the sealing ring 22 into operative position in the retaining groove 30. This feature of the groove construction permits the rapid installation and removal of the sealing ring without the separation of parts. Thus, the sealing ring 22 duplicates almost the same convenience now obtained through the use of synthetic rubber O-rings 16.

The height of the projection or lip 32 can vary, depending upon the thickness of the sealing ring 22, size of groove 30, and the like. Normally, the height of the projection or lip 32 will approximate 0.010 inch.

In Figs. 3, 6, and 7, the sealing rings 22 are illustrated in operative, working positions. While in Fig. 8, the arrows 40 illustrate the application of pressure to the sealing ring as would normally be encounted in a hydraulic or pneumatic actuating cylinder 10 or similar device.

It is to be particularly noted that the material utilized in the manufacture of the sealing ring 22 is relatively thin in proportion to the other working parts. The projection or retaining lip 32 which holds the sealing ring 22 in position in the groove 30 when pressures are encountered from the opposite direction may be seen as being approximately as high as the thickness of the material used in the construction of the sealing ring 22. The lip 24 may not be very thick nor very high because the force required to keep the ring at a position in the groove 30 is very low.

Actually, the thickness of the material used in forming the sealing ring 22 depends upon the type of material used as well as the pressures for which the sealing ring 22 and packing gland 20 is designed. It is apparent that a thin material under very high pressure would collapse the seal in the corner of the groove 30, and the corner formed by the rubbing surface.

In operational use, the sealing ring 22 is inserted in the groove 30 by pushing the lower lip 24 over the projection or lip 32 until the ring snaps into position in the groove. The sealing ring 22 can be easily removed by means of a sharp instrument, such as an ice pick or a narrow-edged screw driver, which can be used to pry up the lower edge 24 of the sealing ring above the projection or lip 32 of the piston 10.

It is to be further observed that the lengths of the lips 24 of the ring 22, and the intermediate portion 23 thereof make up or cover an area of a square. This proportion was selected because it closely approximates the geometry of an O-ring 16.

Obviously many other modifications and variations of the present invention are possible in the light of the above teachings. It is, therefore, to be understood that within the scope of the appended claims the invention may be practiced other than as specifically described.

What is claimed is:

1. A packing gland for sealing two cylindrical shaped mating elements, one of said mating elements having a pair of grooves formed therein at the outer periphery thereof, a thin annular metallic sealing ring located in each of said grooves in said one mating element, each said ring having a semi-circular cross-section, with a flared lip scarfed to a fine edge extending outwardly from each edge of said semi-circular cross-section of said ring at approximately 5° measured from the longitudinal axis of said annular ring and arranged to engage the surface of the other mating element and the surface of said groove in the one mating element with razor blade contact, the flared lips of one of said sealing rings being positioned oppositely from the flared lip of the other sealing ring of said pair of sealing rings, whereby an effective seal is provided between said mating elements, and an integral annular projection in each said groove of said one of said mating elements of substantially the same height as the thickness of said annular ring therein for engagement by one of said flared lips of each of said sealing rings for holding said sealing rings in operative positions in said grooves between said mating elements.

2. In combination, structure defining a cylinder having a piston located therein and a piston rod secured to said piston and extending through an opening formed in said cylinder structure, said piston having a pair of annular grooves formed at the end surfaces at the outer periphery thereof, a metallic reversible, thin annular sealing ring located in each groove of said pair of annular grooves, each said ring having a semi-circular cross-section, a flared lip scarfed to a fine edge extending outwardly from the annular edge of said semi-circular cross-section of each of said rings at approximately 5° measured from the longitudinal axis thereof and arranged to engage the interior surface of said cylinder and said piston with razor edge contact, the flared lips of one of said sealing rings being positioned oppositely from the flared lips of the other sealing ring, an integral annular projection in each groove of said piston of substantially the same height as the thickness of said annular rings for engagement by a lip of each of said sealing rings for holding each said sealing ring in an operative position in its groove between said piston and cylinder, said cylinder structure also having another pair of annular grooves formed therein at said opening for said piston rod, a similar pair of metallic, reversible and oppositely positioned sealing rings in said grooves, with each sealing ring having flared lips extending outwardly from the annular edges thereof and located in said grooves in said cylinder structure, and another integral annular projection in each groove of said pairs of annular grooves in said cylinder structure' of substantially the same height as the thickness of the second pair of annular rings for engagement by a lip of each of said sealing rings of said second pair of sealing rings for holding each said sealing ring of said second pair of sealing rings in an operative position between said piston rod and cylinder structure.

References Cited in the file of this patent

UNITED STATES PATENTS 2,295,160    Christenson _____ Sept. 8, 1944

FOREIGN PATENTS 768,772    France _____ May 28, 1934
716,867    Germany _____ Jan. 30, 1942